United States Patent [19]

Yabuta et al.

[11] Patent Number: 5,025,060

[45] Date of Patent: Jun. 18, 1991

[54] DISPERSION OF FINE PARTICLES OF A POLYMER

[75] Inventors: Motoshi Yabuta; Yasushi Nakao; Shinji Sugiura; Mitsuhiro Fukuda; Yuzo Miyamoto, all of Hiratsuka, Japan

[73] Assignee: Kansai Paint Co., Ltd., Hyogo, Japan

[21] Appl. No.: 596,327

[22] Filed: Oct. 15, 1990

[51] Int. Cl.$^5$ .................... C08J 3/02; C08F 2/16; C08F 20/62

[52] U.S. Cl. .................... 524/533; 524/556; 524/460; 525/450

[58] Field of Search .................... 524/533, 539

[56] References Cited

U.S. PATENT DOCUMENTS 4,829,120  5/1989  Yabuta .................... 524/460

Primary Examiner—Joseph L. Schofer
Assistant Examiner—Wu C. Cheng
Attorney, Agent, or Firm—Wenderoth, Lind & Ponack

[57] ABSTRACT

A dispersion of fine particles of a gelled polymer obtainable by copolymerizing and crosslinking a vinyl monomer mixture containing at least 0.5% by weight each of at least two vinyl monomers in the presence of a macromonomer A, which has a molecular chain of poly(12-hydroxystearic acid) and has at least about one polymerizable unsaturated double bond per molecule in average, and a macromonomer B, which is a copolymer of an ethylenic unsaturated monomer and has a solubility parameter value of from 7.5 to 9.2 and about 1.0 to about 1.5 in average of polymerizable unsaturated double bonds, in an organic solvent which is capable of dissolving the macromonomers A and B but is substantially incapable of dissolving a polymer formed from said vinyl monomer mixture; and a curable resin composition comprising a dispersion of fine particles of the above-described gelled polymer, a base resin which is non-compatible with the macromonomer A but is compatible with the macromonomer B and which forms a continuous phase, and at least one crosslinking agent selected from the group consisting of an amino resin and a polyisocyanate compound.

17 Claims, No Drawings

DISPERSION OF FINE PARTICLES OF A POLYMER

The present invention relates to a dispersion of fine particles of a gelled polymer containing as a dispersion stabilizer a mixture of a macromonomer having a molecular chain of poly(12-hydroxystearic acid) and a macromonomer having a specific solubility parameter, and to a curable resin composition.

Various processes have heretofore been proposed for producing fine particles of a polymer stably dispersed in an organic solvent mainly composed of an aliphatic hydrocarbon with a high polymer dispersion stabilizer, i.e., so-called non-aqueous polymer dispersion as described in, for example, U.S. Pat. Nos. 3,607,821, 4,147,688 and 4,493,914.

According to the conventional processes, dispersed polymer particles are produced in the presence of a dispersion stabilizer composed of a first segment which is solvated with the organic solvent used and a second segment which is substantially non-solvated with the organic solvent used but serves as a portion to be associated with or caught by the dispersed polymer particles, and then the dispersed polymer particles are crosslinked.

Representative examples of the above-described dispersion stabilizer include the one which is composed of a solvatable component which is a self-condensed product of 12-hydroxystearic acid and a non-solvatable component which is a polymer chain mainly composed of methyl mechacrylate, the non-solvatable component being graft- or block-polymerized with the solvatable component.

U.S. Pat. No. 4,829,120 proposes a process in which instead of the block or graft copolymer composed of two segments, a macromonomer having in average about 1.0 polymerizable unsaturated bond per molecule is used as a dispersion stabilizer which is obtained by reacting the hydroxyl or carboxyl group in the self-condensed product of 12-hydroxytearic acid serving as a solvatable component with a polymerizable unsaturated monomer having a functional group such as an epoxy group or an isocyanate group which is reactive with the hydroxyl or carboxyl group, and the macromonomer is used in the step of producing dispersion of fine particles of a polymer.

Also, there has been proposed a process producing dispersion of fine particles of a polymer which process uses as a dispersion stabilizer a macromonomer obtained by introducing a polymerizable double bond to a copolymer of a vinyl monomer having a specific composition and is soluble in an organic solvent mainly composed of an aliphatic hydrocarbon (for example, an acrylic thpe copolymer having a solubility parameter of no higher than 9.0) in a proportion of about 1.0 bond in average per molecule (cf., for example, Japanese Patent Publication (Kokai) No. Sho 57-177068, Japanese Patent Publication (Kokoku) No. Sho 59-33032, and U.S. Patent 4,591,533).

The fine particles of polymers and their dispersions are used as a paint, an adhesive and the like after mixing with a crosslinking agent such as an amino resin or a polyisocyanate compound, and, if desired, further with an acrylic resin, a polyester resin, an alkyd resin or the like.

Their utility, particularly the role and function of the fine particles of polymers in paints, are, for example, (1) to increase solid content; (2) to improve physical properties such as weatherability and mechanical properties of the coating film; (3) to endow the paints with structural viscosity (thixotropic property) to improve the orientation of pigments or slip down resistance (sag resistance).

The above-described two types of conventional fine particles of polymers, i.e., one which uses a dispersion stabilizer containing as a solvation component self-condensed product of 12-hydroxystearic acid (hereinafter, abbreviated as "P-12HSA type" for convenience's sake), and another which uses a dispersion stabilizer containing as a solvation component a copolymer of vinyl monomers having a specific composition (hereinafter, abbreviated as "vinyl copolymer type" for convenience's sake), are considerably different from each other in their properties. For example, when only a small amount of fine particles of the P-12HSA type is added to paints, it gives a great effect to the system with which it is blended and improves the orientation of pigments such as metal flakes, e.g., aluminium flakes and sag resistance in the case of metallic base enamel paints, while in the case of top coat paints, the addition of P-12HSA type to the paints is substantially impracticable because the resulting coating surface has an undesirably decreased luster and a considerably deteriorated smoothness although it is effective in improving sag resistance.

On the other hand, when added to paints, fine particles of the vinyl copolymer type polymer can improve the physical properties of the coating films without substantially decreasing the luster of the coating surface or deteriorating finish appearance such as smoothness. However, there is a problem that their effect of giving structural viscosity to paints is insufficient so that the effect of increasing the orientation of metal flake pigments or sag resistance is not so great.

Furthermore, it is difficult to obtain both improved sag resistance and high luster or smoothness of the coating surface simultaneously even if the both two types of fine particles of polymers were used together.

As is well known, dispersibility of the fine particles of a polymer in coating compositions depends on the balance between dispersive force (repulsive force) and cohesive force (attractive force), and in the case of the fine particles of the polymer the surfaces of which are covered with a dispersion stabilizer polymer, the dispersive force and cohesive force will vary drastically depending on the solubility of the dispersion stabilizer polymer. More specifically, in solvents which are a good solvent to the dispersion stabilizer polymer, the polymer molecules extend sufficiently and a steric repulsive layer is formed thereon to prevent the association and cohesion of the particles. On the other hand, in solvents which are a poor solvent to the dispersion stabilizer the dispersion stabilizer polymer molecules are contracted and therefore they have only a week steric repulsive force so that the dispersion stabilizer polymer molecules tend to agglomerate, resulting in that the fine particles of the polymer themselves tend to agglomerate with each other.

As stated above, the stability of fine particles of a polymer dispersed in an organic solvent is greatly influenced by the solubility of the dispersion stabilizer polymer in the solvent used.

The above-described relationship is true for coating systems comprising fine particles of a polymer/base resin/crosslinking agent/solvent. A paint is coated and according as the solvent evaporates from the paint film, the degree of dispersion and degree of cohesion of fine particles of the polymer in the coating solution or coating film are drastically influenced by the intensity of compatibility of the dispersion stabilizer polymer on the surface of the fine particles of the polymer with the base resin and crosslinking agent which form a continuous phase.

As for the above-described two types of fine particles of polymers, fine particles of the P-12HSA type polymer, which contains self-condensed product of 12-hydroxystearic acid as a dispersion stabilizer, is not compatible with acrylic polymers, polyester polymers, alkyd polymers, polyisocyanate compounds and amide resins such as melamine/formaldehyde resins and urea formaldehyde resins which are usually used in conventional paints, and therefore paints containing fine particles of the P-12HSA type polymer suffer phase separation phenomenon that the dispersion stabilizer polymer is separated from the polymer of continuous phase (base resin/crosslinking agent) according as the solvent evaporates, resulting in that the fine particles of the polymer associate or agglomerate with each other. This leads to increase in the structural viscosity. As a result, the paints exhibit deteriorated luster and smoothness of the coating surface in spite of the possibility that their sag resistance and the orientation of pigments will be improved. On the other hand, fine particles of the vinyl copolymer type polymer generally exhibit very good compatibility with basic resin such as acrylic polymers and the crosslinking agent such as melamine formaldehyde resin, and the fine particles of the polymer will not associate or agglomerate with each other even in the state of a coating solution after evaporation of the solvent or in the state of a coating film because the dispersion stabilizer is a copolymer of vinyl monomers. Therefore, the fine particles of the polymer cannot endow structural viscosity with the paint thus failing to improve sag resistance thereof, although they exhibit excellent luster and smoothness of the coating surface.

Accordingly, extensive investigations have been made in order to obtain fine particles of a polymer which can establish a suitable degree of cohesion stably, which can improve to a greater extent the sag resistance of paints and the orientation of metal flake pigments without giving adverse influences on high luster and smoothness of the coating surface, and which can improve the physical properties of the coating film. As a result, it has now been found that the above object can be achieved by a fine particles which is an internally crosslinked gelled polymer and obtained by the user of two specific type of dispersion stabilizers.

Thus, according to one aspect, the present invention provides a dispersion of fine particles of a gelled polymer obtainable by copolymerizing and crosslinking a vinyl monomer mixture containing at least 0.5% by weight each of at least two vinyl monomers in the presence of a macromonomer A, which has a molecular chain of poly(12-hydroxystearic acid) and has at least about one polymerizable unsaturated double bond per molecule in average, and a macromonomer B, which is a copolymer of an ethylenic unsaturated monomer and has a solubility parameter value of from 7.5 to 9.2 and in average about 1.0 to about 1.5 polymerizable unsaturated double bonds, in an organic solvent which is capable of dissolving the macromonomers A and B but is substantially incapable of dissolving a polymer formed from the vinyl monomer mixture.

According to another aspect, the present invention provides a curable resin composition comprising:

(i) a dispersion of fine particles of the above-described gelled polymer;

(ii) a base resin which is non-compatible with the macromonomer A but is compatible with the macromonomer B and which forms a continuous phase; and (iii) at least one crosslinking agent selected from the group consisting of an amino resin and a polyisocyanate compound.

Hereinafter, the present invention will be explained in further detail.

The dispersion of fine particles of the gelled polymer can be obtained by subjecting a mixture of vinyl monomers to copolymerization reaction and crosslinking reaction in a specific organic solvent using a mixture of the macromonomer A and macromonomer B as a dispersion stabilizer.

The macromonomer A has a molecular chain of poly(12-hydroxytearic acid) (hereinafter, sometimes referred to as "P-12HSA" for brevity) and polymerizable unsaturated double bonds, the P-12HSA has a number average molecular weight preferably within a range of from 1,000 to 3,000, and more preferably from 1,500 to 2,200.

The term "macromonomer" used herein refers to a polymer having one or more polymerizable unsaturated double bonds in its molecule.

Representative examples of the macromonomer A include two types, one of which is a reaction product obtained by reacting P-12HSA with a polymerizable unsaturated compound having a functional group which can react with at least one of the terminal carboxyl or hydroxyl group of P-12HSA to introduce in the molecule at least about one in average, and preferably one, polymerizable unsaturated group per molecule. This type of reaction product can be prepared, for example, by (1) reacting a monoepoxy group-containing polymerizable unsaturated compound such as glycidyl acrylate, glycidyl methacrylate, allyl glycidyl ether, (3,4-epoxycyclohexyl)methyl methacrylate or (3,4-epoxycyclohexyl)methyl acrylate with the terminal carboxyl group of P-12HSA in the presence of a catalyst such as a tertiary amine; or by (2) reacting a monoisocyanate group-containing polymerizable unsaturated compound such as isocyanateoethyl acrylate, isocyanateoethyl methacrylate, m-isopropenyl-alpha,alpha'-dimethylbenzyl isocyanate or an equimolar adduct between a diisocyanate compound and an hydroxyalkyl acrylate or methacrylate with the terminal carboxyl group or secondary hydroxyl group of P-12HSA. A compound obtained by adding glycidyl methacrylate to the terminal carboxyl group of P-12HSA is particularly preferred. In the case where the macromonomer A is prepared by the method (2), there is a possibility that two or more polymerizable double bonds are introduced into the molecule.

The macromonomer A of the first type preferably has in average about one polymerizable double bond per molecule. If more double bonds than the above-described amount are introduced into the molecule, there is a danger that the reaction system will be gelled in its entirety during the production of fine particles of the gelled polymer. For this reason, in the method (2) above, it is preferred that an isocyante group-containing unsaturated monomer is reacted with P-12HSA in a proportion of about 1 mole, for example, per mole of P-12HSA. As a result of this, double bonds can be introduced into the secondary hydroxyl group of P-12HSA. If the number of the polymerizable double bond introduced is less than about one in average per molecule, graft ratio of the polymerizable unsaturated group to be introduced is smaller than is required, and the stability of particles is deteriorated during and after their synthesis. In the production of the macromonomer, usually known polymerization inhibitors and if desired, catalysts such as tertiary amines and dibutyl tin dilaurate can be used.

The second type examples of the macromonomer A include graft copolymers comprising a polymerizable unsaturated group or block copolymers which have two segments, one being a solvatable component composed of P-12HSA and the other being a non-solvatable component which is composed of a copolymer mainly composed of high polar monomers such as methyl methacrylate, which may be a comb type copolymer. Such second type macromonomer A can be prepared by providing a reaction product having in average about one polymerizable double bond per molecule obtained, for example, by the method (1) or (2) above used in the preparation of the first type macromonomer A, further reacting the reaction product with a mixture of a polymerizable unsaturated monomer having, for example, an epoxy group and a polymerizable unsaturated monomer having no reactive group which reacts with the epoxy group, by graft copolymerization or block copolymerization to form a grafted epoxy group-containing copolymer, and reacting a polymerizable unsaturated compound having a carboxyl group with the epoxy in the grafted epoxy group-containing copolymer so that in average at least about one, preferably from about 1 to 10, and more preferably from 4 to 7, polymerizable double bonds per molecule can be introduced into the molecule.

As for the polymerizable unsaturated monomer having an epoxy group which can be used in the preparation of the second type macromonomer A, there can be cited, for example, glycidyl acrylate, glycidyl methacrylate, allyl glycidyl ether, (3,4-epoxycyclohexyl)-methyl methacrylate, (3,4-epoxycyclohexyl)methyl acrylate and the like. As for the polymerizable unsaturated compound having a carboxyl group which reacts with an epoxy group, there can be cited, for example, acrylic acid, methacrylic acid, crotonic acid, and half esters of maleic acid or fumaric acid, and the like. In order to introduce a polymerizable unsaturated group into the copolymer by reacting the epoxy group in the copolymer with the carboxyl group-containing polymerizable unsaturated compound, there can be used conventional methods such as a method in which both of the copolymer and the copolymerizable unsaturated compound are subjected to addition reaction in the presence of a catalyst such as a tertiary amine.

As for the polymerizable unsaturated monomer having no reactive group which reacts with the epoxy group, there can be used, for example, the following compounds:

(a) Esters of acrylic acid or methacrylic acid: e.g., $C_{1-18}$-alkyl esters of acrylic acid or methacrylic acid such as methyl acrylate, ethyl acrylate, propyl acrylate, isopropyl acrylate, butyl acrylate, hexyl acrylate, octyl acrylate, lauryl acrylate, methyl methacrylate, ethyl methacrylate, propyl methacrylate, isopropyl methacrylate, butyl methacrylate, hexyl methacrylate, octyl methacrylate and lauryl methacrylate; $C_{2-8}$-alkenyl esters of acrylic acid or methacrylic acid such as allyl acrylate and allyl methacrylate; $C_{2-8}$-hydroxyalkyl esters of acrylic acid or methacrylic acid such as hydroxyethyl acrylate, hydroxyethyl methacrylate, hydroxypropyl acrylate and hydroxypropyl methacrylate; $C_{3-18}$-alkenyloxyalkyl esters of acrylic acid or methacrylic acid such allyloxyethyl acrylate and allyloxyethyl methacrylate; and the like.

(b) Vinyl aromatic compounds: e.g., styrene, alphamethylstyrene, vinyltoluene, p-chlorostyrene and vinylpyridine.

(c) Other compounds: e.g., acrylonitrile, methacrylonitrile, methyl isopropenyl ketone; vinyl acetate, BEOVA monomer (a product by Shell Co.), vinyl propionate and vinyl pivalate; and the like.

Among the above-described vinyl monomers, particularly preferred are the esters of acrylic acid or methacrylic acid described in (a) above, and more particularly high polar monomers such as methyl methacrylate. It is desirable that the monomer which is an ester of acrylic acid or methacrylic acid and is highly polar such as methyl methacrylate occupy at least 50% by weight, and more preferably from 55 to 85% by weight, of the sum of the monomers in the polymerizable unsaturated monomer mixture used in the polymerization.

As for the second type macromonomer A, particularly preferred is a macromonomer which can be obtained by providing a polymerizable unsaturated group-containing reaction product having in average about one polymerizable double bond per molecule obtained as by adding glycidyl methacrylate to a terminal carboxyl group of a poly(12-hydroxystearic acid), further reacting the reaction product with a polymerizable unsaturated monomer mixture mainly composed of methyl methacrylate and containing glycidyl methacrylate by graft copolymerization or block copolymerization to form a grafted epoxy group-containing copolymer, and adding acrylic acid or methacrylic acid to the grafted epoxy group-containing copolymer so that in average from 4 to 7 polymerizable double bonds per molecule can be introduced into the molecule.

The polymerization of the above-described monomer mixture can be performed by the conventional radical polymerization method using a radical polymerization initiator. Examples of the radical polymerization initiator which can be used include azo type initiators such as 2,2'-azobisisobutyronitrile and 2,2'-azobis(2,4-dimethylvaleronitrile; peroxide type initiators such as benzoyl peroxide, lauryl peroxide and tert-butyl peroctoate; and the like. The polymerization initiators can be used in an amount generally within a range of from 0.5 to 10 parts by weight, preferably from 0.3 to 3 parts by weight, per 100 parts by weight of the monomer mixture subjected to the polymerization.

From the point of view of ease of reaction and the like, it is most preferred to prepare the second type of above-described combination of an epoxy group-containing polymer and a carboxyl group-containing polymerizable unsaturated compound (epoxy group/carboxyl group). However, in addition to this combination, various combinations can be used such as a combination of a hydroxyl group-containing polymer and an isocyanate group-containing polymerizable unsaturated compound (hydroxyl group/isocyanate group), a combination of an epoxy group-containing polymer and an amino group-containing polymerizable unsaturated compound (epoxy group/amino group), a combination of an isocyanate group-containing polymer and an amino group-containing polymerizable unsaturated compound (isocyanate group/amino group), and combinations obtained by exchanging the reactive groups in the above-described combinations.

In the present invention, the second type macromonomer A is particularly preferred.

The macromonomer B is a copolymer of ethylenic unsaturated monomers which has a solubility parameter (SP value) within a range of from 7.5 to 9.2, preferably from 8.0 to 9.0, and more preferably from 8.3 to 8.9, and in average from about 1.0 to about 1.5, and preferably from 1.0 to 1.2, polymerizable double bonds per molecule. Also, the macromonomer B has a number average molecular weight within a range of preferably from 3,000 to 20,000, and more preferably from 4,000 to 10,000, and a hydroxyl group value within a range of from 45 to 150 mgKOH/g in view of tis reactivity with a crosslinking agent such as a melamine resin or a polyisocyanate compound when fine particles of the gelled polymer are blended in paints. More preferred hydroxyl group value is within a range of from 50 to 120 mgKOH/g. If the SP value of the macromonomer B is less than 7.5, the fine particles of the gelled polymer produced are scarcely compatible with the basic resin or crosslinking agent which forms a continuous phase. On the contrary, if the SP value exceeds 9.2, not only compatibility with the base resin which forms a continuous phase is decreased but also the polymer becomes insoluble in solvents mainly composed of aliphatic hydrocarbons, thus failing to sufficiently serve as a dispersion stabilizer for fine particles of the gelled polymer.

Herein, the "solubility parameter (SP value" is a value which is obtained theoretically by calculation according to the following formula:
SP value: $\delta$ $$\delta \times 100 = (\delta_a \times A) + (\delta_b \times B) + (\delta_c \times C) + \ldots$$

wherein
$\delta$: the solubility parameter of the copolymer;
$\delta_a$, $\delta_b$, $\delta_c$ ... the solubility parameters of the monomers a, b, c ... ; and
A, B, C ... : % by weight of the monomers a, b, c ... in the polymer.

The macromonomer B has in average from about 1.0 to about 1.5, and preferably from 1.0 to 1.2, polymerizable unsaturated double bonds per molecule. If the number of the polymerizable unsaturated double bond is less than about 1.0, the graft ratio of the macromonomer B grafted to the fine particles of the gelled polymer is too small to prevent tendency of the occurrence of the agglomeration of particles or of the aggravation of the stability of particles. On the other hand, if the number exceeds about 1.5, the system tends to show increased viscosity or become gelled.

The macromonomer B includes, for example,
(1) polymers having a double bond in a side chain which can be obtained by copolymerizing a vinyl monomer mainly composed of a long chain alkyl ester of acrylic acid or methacrylic acid, such as octyl acrylate, lauryl acrylate, stearyl acrylate, octyl methacrylate, lauryl methacrylate or stearyl methacrylate, a carboxyl group-containing vinyl monomer such as acrylic acid or methacrylic acid, and optionally a hydroxyl group-containing vinyl monomer such as 2-hydroxyethyl acrylate, 2-hydroxyethyl methacrylate, hydroxypropyl acrylate or hydroxypropyl methacrylate, to form a copolymer having a carboxyl group, and then reacting glycidyl acrylate or glycidyl methacrylate with the carboxyl group of the copolymer;
(2) polymers having a double bond in a side chain which can be obtained in the same manner as in (1) above except that copolymerization is performed using glycidyl acrylate or glycidyl methacrylate in place of the carboxyl group-containing vinyl monomer, followed by reacting acrylic acid or methacrylic acid with the glycidyl group of the resulting copolymer;
(3) polymers having a double bond in a side chain which can be obtained by copolymerizing the above-described vinyl monomer mainly composed of a long chain alkyl ester of acrylic acid or methacrylic acid, the above-described hydroxyl group-containing vinyl monomer and optionally the carboxyl group-containing vinyl monomer to form a copolymer having a hydroxyl group, and reacting the hydroxyl group of the copolymer with a monoisocyanate group-containing unsaturated monomer such as an equimolar adduct between isocyanatoethyl acrylate, isocyanatoethyl methacrylate, m-isopropentyl-alpha,alpha-dimethylbenzyl isocyanate or an equimolar adduct between a diisocyanate compound and a hydroxyalkyl acrylate or hydroxyalkyl methacrylate; and the like.

In addition, polymers having a double bond at the terminals thereof can be used as the macromonomer B. Such polymers can be produced, for example, by a method in which a carboxyl group is introduced to a terminal of the polymer in the presence of a thioglycolic acid such as alpha-mercaptopropionic acid using gamma,gamma'-azobis-gamma-cyanovaleric acid as a polymerization initiator, and glycidyl (meth)acrylate is added to the carboxyl group; a method in which a hydroxyl group is introduced at a terminal of the polymer using a combination of gamma,gamma'-azobis(gamma-cyano-n-pentanol) and 2-mercaptoethanol, and then an isocyanate group-containing monomer is added to the hydroxyl group; or the like.

Among the polymers which can be used as the macromonomer B, those described in (1) above are preferred.

In the dispersion of fine particles of the gelled polymer, the vinyl monomer mixture used for forming fine particles is a vinyl monomer mixture containing at least two vinyl monomers having respective complementary functional groups which can react to be bonded with each other. Examples of the combination of complementary funtional groups which can react to be bonded with each other include the following:
(i) an epoxy group/an carboxyl group,
(ii) a hydroxyl group/an isocyanate group,
(iii) an epoxy group/an amino group,
(iv) an isocyanate group/an amino group,
(v) an alkoxysilyl group/a hydroxyl group, and
(vi) an epoxy group/a phosphoric acid group.

Specific examples of the combinations of at least two vinyl monomers having respective complementary functional groups which can react to be bonded with each other include the following:
Examples of (i): combinations of an epoxy group-containing monomer such as glycidyl acrylate or glycidyl methacrylate, with a carboxyl group-containing monomer such as acrylic acid or methacrylic acid;
Examples of (ii): combinations of a hydroxyl group-containing monomer such as hydroxyethyl acrylate or hydroxyethyl methacrylate with an isocyanate group-containing monomer such as isocyanatoethyl acrylate, isocyanatoethyl methacrylate, m-isopropenyl-alpha,alpha-dimethylbenzyl isocyanate, and equimolar adducts between a diisocyanate compound such as isophorone diisocyanate and an hydroxyalkyl acrylate or methacrylate;

Examples of (iii): combinations of the above-described epoxy group-containing monomer with an aminoalkyl acrylate or methacrylate monomer;

Examples of (iv): combinations of the above-described isocyanate group-containing monomer with the above-described amino alkyl acrylate or methacrylate monomer;

Examples of (v): combinations of the above-described hydroxyl group-containing monomer with an alkoxysilyl group-containing monomer such as gamma-methacryloyloxypropyltrimethoxysilane;

Examples of (vi): combinations of the above-described epoxy group-containing monomer with a phosphoric acid group-containing monomer such as acid phosphooxyethyl (meth)acrylate; and the like.

Among these combinations, combinations (i), (ii), (v) and (vi) above are preferred, with (i) being particularly preferred.

The reaction between the complemetary functional groups results in intraparticle crosslinking of the particles. In order to promote the intraparticle cross-linking, a small amount of a polyvinyl monomer may be used in addition to the above-described monomers having complementary functional groups. The polyvinyl monomer is a vinyl monomer having at least two polymerizable double bonds in the molecule, for example, divinylbenzene, ethylene glycol diacrylate, adducts between isocyanatoethyl acrylate and hydroxyethyl acrylate or methacrylate.

The above-described at least two vinyl monomers having respective complementary functional groups may be present in the vinyl monomer mixture each in a concentration of no lower than 0.5% by weight, preferably from 0.5 to 20% by weight, and more preferably from 1.0 to 5.0% by weight. The polyvinyl monomer may be present in the vinyl monomer mixture in a concentration of lower than 5.0% by weight, and preferably lower than 2.0% by weight. These vinyl monomers serve as a component for crosslinking the fine particles of the polymer and their amount and kind or combination of the monomers may be selected freely depending on the desired performance of products.

The vinyl monomer mixture for forming fine particles may contain in addition to the above-described monomer for crosslinking at least one other copolymerizable vinyl monomer. The other vinyl monomer which can be used in the present invention is not limited particularly but any type of radical polymerizable unsaturated monomer can be used. Representative examples thereof include the polymerizable unsaturated monomers selected from amont the above-described polymerizable unsaturated monomers (a), (b) and (c) used for the preparation of the macromonomer A.

Among these other vinyl monomers, particularly preferred are esters of methacrylic cid or acrylic acid. Of these, methyl methacrylate is particularly preferred. It is preferred that the other vinyl monomers occupy at least 50% by weight, preferably from 50 to 90% by weight, and more preferably from 55 to 75% by weight, of the vinyl monomer mixture subjected to the polymerization reaction.

Furthermore, it is prefered that the proportion of the macromonomer A to the macromonomer B, A/B, is within a range of from 70/30 to 20/80, preferably from 50/50 to 25/75, and more preferably from 50/50 to 35/65 as weight ratio of solid content in order to sufficiently exhibit both effects of preventing sagging and improving the luster and smoothness of the coating surface simultaneously. Further, the ratio of the dispersion stabilizer which is the sum of the macromonomers A and B, to the amount of the vinyl monomer mixture forming fine particles, i.e., a weight ratio of dispersion stabilizer/vinyl monomer mixture is generally within a range of from 10/90 to 60/40, preferably from 20/80 to 40/60, and more preferably from 25/75 to 35/65. If the amount of the dispersion stabilizer is too small, coarser particles tend to be formed and the stability of the dispersion tends to be deteriorated. On the other hand, if the amount of the dispersion stabilizer is too large, there is a tendency that fine particles with a very small particle diameter (no greater than 0.06 $\mu$m) are formed, resulting in that the effect of preventing sagging tends to be insufficient.

The organic liquid used as a dispersing agent upon preparing the dispersion of fine particles of the polymer of the present invention includes organic liquids which are substantially immishcible with water that do not dissolve fine particles of the polymer produced but is a good solvent to the macromonomers A and B, i.e., a dispersion stabilizer, and to the vinyl monomer mixture. Suitable examples of such organic liquids include petroleum aliphatic hydrocarbons such as hexane, heptane, octane and mineral spirit. These may be used singly or as admixtures with one or more other organic solvents having a relatively low polarity such as toluene, xylene and butyl acetate. When used as a mixed solvent, it is particularly preferred that the above-described petroleum aliphatic hdyrocarbons occupy at least 60% by weight of the mixed solvent.

The copolymerization of the vinyl monomer mixtures in the above-described organic liquids in the presence of the macromonomer according to the present invention can be performed by a known method such as the one described in Japanese Patent Publication (Kokai) No. Sho 57-177068. The reaction temperature upon the polymerization is generally within a range of from 60° to 160° C., and more preferably from 75° to 130° C., and the reaction can be concluded usually in from 4 to88 hours.

The fine particles of the crosslinked, gelled polymer of the present invention can be prepared by various method such as a method in which dispersed polymer particles having complementary functional groups are formed beforehand and the particles are crosslinked with a tertiary amine catalyst to carry out in the particles a crosslinking reaction through the complementary functional groups, and a method in which a tertiary amine catalyst is mixed with a vinyl monomer mixture beforehand, and simultaneously with a polymerization reaction for forming dispersed polymer particles a crosslinking reaction in the polymer particle is carried out. In the latter method, it is desirable to keep the concentration of the vinyl monomer mixture in the reaction system to a level lower than the former method in order to avoid the occurrence of gelling of the entire polymer system.

The tertiary amine catalyst which can be used as a catalyst for the reaction between the complementary functional groups is not limited particularly but a wide variety of the tertiary amines can be used, which include, for example, dimethylaminoethanol, diethylaminoethanol and N,N-dimethyl-n-dodecylamine. In the case where intraparticle crosslinking is effected with a combination of the isocyanate group-containing monomer and the hydroxyl group-containing monomer, an organation catalyst or the like can be used, if desired.

Important requirements of the polymerization reaction used in the present invention are to lower the concentrations of monomers in the organic liquid, and to increase the interparticle distance of dispersed polymer particles which are being formed to a sufficiently large value. As for the former requirement, it is important to elevate the temperature to a level high enough to be necessary for the decomposition the polymerization initiator used in order to increase the polymerization rate of the monomers and control the rate of supplying the monomers appropriately. Otherwise, there is a danger that the entire reaction system will be gelled when the concentrations of the monomers increase.

As for the latter requirement, it is important to keep the concentration of the dispersed polymer particles at a predetermined level. More particularly, it is preferred to complete the polymerization reaction with controlling the concentration of the dispersed polymer particles being formed is no higher than 40% by weight, preferably no higher than 30% by weight. If the concentration of the dispersed polymer particles exceeds 40% by weight, generally gelling tends to occur or coarser particles tend to be formed.

In the case where those monomers are used whose complementary functional groups are an isocyanate group/a hydroxyl group or a phosphoric acid group/an epoxy group, the respective monomers had better be put in separate tanks, respectively. If the monomers are blended in the same tank, there should be a possibility that gelling occurs or undesired coarse particles are formed during the synthesis of the particles due to the formation of a divinyl monomer occurring as a result of the reaction of the monomers prior to their dropping into the reaction tank.

Needless to say, in the case where crosslinking is to be effected in the particles using a combination of an isocyanate group-containing monomer/a hydroxyl group-containing monomer, those solvents which are reactive with isocyanate groups such as alcoholic solvents should not be used as a reaction medium.

The curable resin composition of the present invention can be prepared by blending (i) a dispersion of fine particles of the above-described gelled polymer, particularly that prepared using the above described second type macromonomer A with a resin composition comprising (ii) a base resin which is non-compatible with the macromonomer A but is compatible with the macromonomer B and which forms a continuous phase and (iii) at least one crosslinking agent selected from the group consisting of an amino resin and a polyisocyanate compound, and the composition of the present invention can improve the sag resistance and the orientation of pigments greatly without giving adverse influences on the luster and smoothness of the coating surface due to the presence of the above-described dispersion (i).

As the component (i) in the curable resin composition of the present invention, a dispersion of fine particles of the above-described gelled polymer obtained using the second type of the macromonomer A is pratically preferred in view of the sag resistance of the coating composition and the orientation of pigments contained therein.

The base resin (ii) is not limited particularly, and any one selected from a wide variety of resins such as acrylic resins, polyester resins, alkyl resins and the like can be used so far as it is not compatible with the macromonomer A but compatible with the macromonomer B, and it can be cured with blending (iii) the crosslinking agent therewith to exhibit the desired properties other than the sag resistance. In the case where the curable resin composition of the present invention is used as a top coat paint, acrylic resins having a number average molecular weight within a range of from 3,000 to 50,000, and preferably from 3,500 to 25,000, a solubility parameter (SP value) within a range of from 7.5 to 9.5, and preferably from 8.0 to 9.3, and a hydroxyl value within a range of from 45 to 170 mgKOH/g, and preferably from 60 to 140 mgKOH/g are particularly desirable.

As for the acrylic resins, those resins obtained by polymerizing ethylenic unsaturated monomers mainly composed of acrylic or methacrylic acid esters in organic solvents such as aromatic hydrocarbons, esters, ethers, ketones, alcohols and aliphatic hydrocarbons by a known method. An example of usually used polymerization methods is a solution radical polymerization method using a polymerization initiator. As for the ethylenic unsaturated monomer to be polymerized, there can be cited, for example, the above-described monomers referred to above as the polymerizable unsaturated monomer having no reactive group which reacts with an epoxy group which is monomers (a), (b) and (c), used in the production of the second type macromonomer A; the monoepoxy group-containing unsaturated monomers referred to above with respect to the production of the first type macromonomer A; carboxyl group-containing polymerizable unsaturated compounds such as acrylic acid, methacrylic acid, crotonic acid and half esters of maleic acid or fumaric acid; and the like.

In the present invention, the compatibility of the macromonomers A or B with the base resin (ii) which forms a continuous phase is judged by the following method.

That is, the macromonomer and the base resin are blended and mixed in a weight proportion of solid content of 1/1, and the resulting mixture is coated on a glass plate to a dry thickness after evaporation of the solvent of about 100 μm, and the solvent is evaporated at a temperature of from 0° to 30° C. until the amount of the residual solvent which remains in the coating film decreases to a value of less than 5% by weight. When a light of a wavelength of 500 nm passes the coated plate in an optical transmission ratio of no lower than 90%, they are judged to be "compatible" with each other. On the other hand, when the optical transmission ratio is below 90%, they are judged to be "not compatible" with each other. If "compatible" or "not compatible" is determined by visual observation and those "compatible" are transparent with no turbidity, white-opaqueness, bluish color or phase separation being observed.

The crosslinking agent (iii) in the curable resin composition of the present invention is at least one compound selected from amino resins and polyisocyanate compounds.

Representative examples of the amino resin include condensation reaction products obtained by reacting an amino group-containing compound component such as melamine, urea, acetoguanamine, benzoguanamine, spiroguanamine or st eroguanamine with an aldehyde compound component such as formaldehyde, paraformaldehyde, acetaldehyde or glyoxal by a conventional method; or melamine resins, urea resins or benzoguanamine resins obtained by modifying the condensates with an alcohol. Any type of amino resin that is usually used for paints can be used in the present invention. Among them, preferred are those resins obtained by partially or completely etherating the condensates with $C_{1-4}$-alcohols.

Specific examples of the melamine resins include hexamethyl etherated methylmelamine, hexabutyl etherated methylmelamine, methyl butyl mixed etherated methylmelamine, methyl etherated methylolmelamine, butyl etherated methylolmelamine or isobutyl etherated methylolmelamine, or various condensates of these melamines. Specific examples of the above-described polyisocyanate compound include organic diisocyanates themselves, for example, aliphatic diisocyanates such as hexamethylene diisocyanate and trimethylhexamethylene diisocyanate; alicyclic diisocyanates such xylylene diisocyanate and isophorone diisocyanate; aromatic diisocyanates such as tolylene diisocyanate, 4,4'-dipehnylmethane diisocyanate; or adducts of the organic diisocyanate with a polyhydric alcohol, a low molecular weight polyester resin or water; polymers of the above-described organic diisocyanates with one another; those having a free isocyanate group such as isocyanate biuret; blocked polyisocyanates obtained by blocking free isocyanate groups with a blocking agent; and the like. Representative examples of the compound having a free isocyanate group which are available commerically include Burnock D-750, D-800, DN-950, DN-970 or 15-455 (products by Dainippon Ink and Chemicals, Incorporated), Desmodur L, N, HL or IL (products by Bayer AG, F. R. Germany), Takenate D-102, D-202, D-110N or D-123N (products by Takeda Chemical Industries, Ltd.) Coronate L, HL, EH or 203 (products by Nippon Polyurethane Industry Co., Ltd.), or Duranate 24A-90CX (a product by Asahi Chemical Industry Co., Ltd.). The blocked polyisocyanate compounds can be obtained by blocking a polyisocyanate compound using a known blocking agent. Representative commerically available examples thereof include Burnock D-550 (a product by Dainippon Ink and Chemical Industries, Ltd.), Takenate B-815-N (a product by Takeda Chemcial Industries, Ltd.) ADDITOL VXL-80 (a product by Hoechst AG, Germany), Coronate 2507 (a product by Nippon Polyurethane Industry Co., Ltd.), and the like. Also, polymers of isocyanate group-containing monomers such as isocyanatoethyl (meth)acrylate and m-isopropenyl-alpha,alpha-dimethylbenzyl isocyanate or copolymers of the monomers with other ethylenic unsaturated monomers can be used as an isocyanate crosslinking agent.

In the case where a curable resin composition is prepared by blending a polyisocyanate compound having a free isocyanate group as a crosslinking agent, usually it is preferred to use the polyisocyanate compound in the form of a two pack type and mixed just before the use because there is a possibility that the polyisocyanate compound could react with hydroxyl groups in the fine particles of the polymer or base resin. On the other hand, when the blocked polyisocyanate compound or amino resin is blended, they can be used also in the form of a one pack type.

The proportion (i)/(ii)/(iii) of (i) the dispersion of fine particles of the gelled polymer, (ii) the base polymer and (iii) the crosslinking agent in 100 parts by weight of sum of (i), (ii) and (iii) is generally within a range of 2 to 30/35 to 85/10 to 40, and preferably 5 to 25/45 to 65/20 to 40, as weight ratio of solid contents.

The curable resin composition of the present invention thus obtained can be used as it is as a transparent paint or as a pigmented paint after dispersing therein a pigment.

Representative examples of the pigment which can be blended with the curable resin composition of the present invention include inorganic pigments such as titanium oxide and carbon black; various organic pigments such as quinacrydone type pigments and azo type pigments; metal powders such as aluminium powder, copper powder and zinc powder; and the like.

A curing catalyst may be blended with the curable resin composition of the present invention, if desired. Also, various known additives such as various resins and solvents, flowability controlling agents, color separation inhibitors, antioxidants, ultraviolet absorbents and silane coupling agents may be added to the curable resin composition of the present invention.

As for the curing catalyst, there can be used, for example, dibutyl tin diacetate, dibutyl tin dioctate, dibutyl tin dilaurate, triethylamine and diethanolamine in the case where blocked or unblocked polyisocyanate compounds are used as a crosslinking agent; and p-toluenesulfonic acid, phosphoric acid, alkyl phosphates, dinonylnaphthalenedisulfonic acids, dodecylbenzenesulfonic acid or organic amine-blocked compounds derived therefrom, whose representative examples include Beckamine P-198 (a product by Dainippon Ink and Chemicals, Inc.), Nacure 155, 2500X, X-49-110, 5225 or 3525 (products by King Industries, Ltd., U.S.A.)

The curable resin composition containing the dispersion of fine particles of the polymer of the present invention can improve greatly the properties of the coating surface, particularly sag resistance on a vertical plane and the orientation of metal flake pigments, without giving adverse influences to the luster and smoothness thereof because the composition contains fine particles of the specified polymer.

Hereinafter, the present invention will be explained greater detail with reference to examples and comparative examples.

In the examples and comparative examples, all "parts" and "%" are "parts by weight" and "% by weight".

PREPARATION OF DISPERSION STABILIZER

Preparation Example 1

12-Hydroxystearic acid was dehydrocondensed to a resin acid value of 30 under reflux of toluene using methanesulfonic acid as a catalyst to obtain a self-condensed polyester with a terminal carboxyl group and having an average molecular weight of about 1,800. Glycidyl methacrylate was added to the terminal carboxyl group of the resulting polyester using dimethylaminoethanol as a catalyst to introduce in the polymer a polymerizable double bond, thus obtaining a solution of macromonomer A-1 having a solid content of 70%. The macromonomer A-1 thus obtained had about one polymerizable unsaturated double bond per number average molecular weight of one molecule.

Preparation Example 2

Butyl acetate (174 parts) was charged in a flask and heated under reflux. To this was added dropwise a mixture of:

| | |
|---|---|
| 70% Macromonomer A-1 | 297.0 parts |
| Methyl methacrylate | 195.9 parts |
| Glycidyl methacrylate | 18.5 parts |
| Xylene | 163.0 parts |
| 2,2'-Azobisisobutyronitrile | 9.6 parts | at a uniform rate ofr 3 hours. The resulting mixture was aged for 2 hours.

Then, a mixture of:

| | |
|---|---|
| p-t-Butylcatechol | 0.05 part |
| Methacrylic acid | 3.8 parts |
| Dimethylaminoethanol | 0.5 part | was introduced in the flask and the reaction was continued at about 140° C. for about 5 hours until the resin acid value reached 0.5 to obtain a solution of macromonomer A-2 having a solid content of 50%. The macromonomer A-2 thus obtained was a graft polymer having a first segment composed of P-12HSA and a second segment composed of a copolymer of methyl methacrylate and glycidyl methacrylate, and had about 4 polymerizable unsaturated double bond per molecule.

Preparation Example 3

Xylene (100 parts) was heated at 130° C. in a reactor, to which was added dropwise a mixture of the following monomers and polymerization initiator for 3 hours, and the resulting mixture was aged for 2 hours after completion of the dropwise addition.

| | |
|---|---|
| 2-Ethylhexyl methacrylate | 50 parts |
| n-Butyl methacrylate | 33 parts |
| 2-Hydroxyethyl methacrylate | 15 parts |
| Methacrylic acid | 2 parts |
| 2,2'-Azobisisobutyronitrile | 2 parts |

The resulting acrylic resin varnish had a solid content of 50% and a number average molecular weight of the acrylic resin was 7,000.

To 202 parts of the acrylic resin varnish thus obtained were added the following compounds:

| | |
|---|---|
| Glycidyl methacrylate | 1 part |
| 4-tert-Butylpyrocatechol | 0.02 part |
| Dimethylaminoethanol | 0.1 part | and the resulting mixture was stirred at 130° C. for 5 hours to introduce a copolymerizable double bond into the molecule to obtain a solution of macromonomer B. The number of double bond introduced to the macromonomer B was about 1.0 per number average molecular weight. Also Macromonomer B had an SP value of 8.40 and a hydroxyl group value of 64.7 mgKOH/g.

PREPARATION OF POLYMER FINE PARTICLE DISPERSION

Preparation Example 4

| | |
|---|---|
| 70% Macromonomer A-1 solution | 14.3 parts |
| 50% Macromonomer B | 46.0 parts |
| Heptane | 197.0 parts | were charged in a flask. To this was added dropwise a mixture of the following monomers and polymerization initiator at a reflux temperature in 5 hours, and the resulting mixture was aged for 4 hours to obtain a polymer fine particle dispersion (I).

| | |
|---|---|
| Styrene | 10 parts |
| Methyl methacrylate | 55 parts |
| Methyl acrylate | 10 parts |
| Acrylonitrile | 5 parts |
| 2-Hydroxyethyl acrylate | 15 parts |
| Glycidyl methacrylate | 2 parts |
| Methacrylic acid | 3 parts |
| 2,2'-Azobisisobutyronitrile | 2 parts |
| Dimethylaminoethanol | 0.1 part |

The dispersion (I) thus obtained was a white dispersion which had a solid content 40%. The particle diameter of the dispersed particles was about 270 μm (peak particle diameter).

The measurement of the particle diameter was performed according to quasi-electric light scattering method using COULTER W-4 model produced by Coulter Counter, Co. Hereinafter, the particle diameter was measured substantially according to this method.

The dispersed particles were insoluble in acetone and ethyl acetate, which confirmed that the particles were crosslinked.

Preparation Example 5

| | |
|---|---|
| 50% Macromonomer A-2 solution | 30 parts |
| 50% Macromonomer B solution | 70 parts |
| Heptane | 175 parts | were charged in a flask. To this was added dropwise a mixture of the following monomers and polymerization initiator at a reflux temperature in 5 hours, and then resulting mixture was aged for 2 hours to obtain a polymer fine particle dispersion (II).

| | |
|---|---|
| Methyl methacrylate | 61 parts |
| n-Butyl acrylate | 20 parts |
| Acrylonitrile | 2 parts |
| Methyl acrylate | 5 parts |
| 2-Hydroxyethyl acrylate | 10 parts |
| m-Isopropenyl-alpha,alpha-dimethylbenzyl isocyanate | 2 parts |
| t-Butyl peroctoate | 2 parts |

The dispersion (II) thus obtained was a white dispersion which had a solid content 40%. The particle diameter of the dispersed particles was about 250 nm (peak particle diameter).

The dispersed particles were gelled particles which were insoluble in acetone and ethyl acetate.

In the above-described procedure, m-isopropenyl-alpha,alpha-dimethylbenzyl isocyanate was supplied separately from 2-hydroxyethyl acrylate through a different dropping funnel.

Preparation Example 6

Example 5 was repeated except that the mixture of monomers and polymerization initiator dropped was replaced by the following mixture and the time of aging after completion of the dropping the mixture was changed to 4 hours to obtain a polymer fine particle dispersion (III).

| | | |
|---|---|---|
| Styrene | 25 | parts |
| Methyl methacrylate | 62 | parts |
| Acrylonitrile | 2 | parts |
| Methyl acrylate | 5 | parts |
| Glycidyl methacrylate | 2 | parts |
| Acrylic acid | 4 | parts |
| 2,2'-Azobisisobutyronitrile | 1.5 | parts |
| Dimethylaminoethanol | 0.1 | part |

The dispersion (III) thus obtained was a white dispersion which had a solid content of 40%. The particle diameter of the dispersed particles was about 240 nm (peak particle diameter). The dispersed particles were gelled particles which were insoluble in acetone and ethyl acetate.

Preparation Example 7

| | | |
|---|---|---|
| Heptane | 175 | parts |
| 50% Macromonomer A-2 solution | 20 | parts |
| 50% Macromonomer B solution | 30 | parts | were charged in a flask. To this was added dropwise a mixture of the following monomers and polymerization initiator at a reflux temperature in 5 hours, and the resulting mixture was aged for 2 hours to obtain a polymer fine particle dispersion (IV).

| | | |
|---|---|---|
| 50% Macromonomer A-2 solution | 20 | parts |
| 50% Macromonomer B solution | 30 | parts |
| Styrene | 20 | parts |
| Methyl methacrylate | 60 | parts |
| 2-Hydroxyethyl acrylate | 15 | parts |
| Glycidyl methacrylate | 1.5 | parts |
| Acid phosphooxyethyl methacrylate | 1.5 | parts |
| 2,2'-Azobisisobutyronitrile | 2 | parts |

The dispersion (IV) thus obtained was a white dispersion which had a solid content 40%. The particle diameter of the dispersed particles was about 210 nm (peak particle diameter). The dispersed particles were gelled particles which were insoluble in acetone and ethyl acetate.

In the above-described procedure, glycidyl methacrylate was supplied separately from acid phosphooxy methacrylate through a different dropping funnel.

Preparation Example 8 (Comparative Example)

| | | |
|---|---|---|
| 50% Macromonomer A-2 solution | 6 | parts |
| Methyl methacrylate | 10 | parts |
| Heptane | 172 | parts |
| 2,2'-Azobisisobutyronitrile | 0.2 | part | were charged in a flask and reacted for 1 hour at a reflux temperature. To this was added dropwise a mixture of the following monomers and polymerization initiator in 5 hours, and the resulting mixture was reacted, followed by aging for 4 hours to obtain a polymer fine particle dispersion (V).

| | | |
|---|---|---|
| 50% Macromonomer A-2 solution | 24 | parts |
| Methyl methacrylate | 60 | parts |
| Glycidyl methacrylate | 1 | part |
| Methacrylic acid | 1 | part |
| 2,2'-Azobisisobutyronitrile | 1 | part |
| Dimethylaminoethanol | 0.1 | part |

The dispersion (V) thus obtained was a white dispersion which had a solid content 40%. The particle diameter of the dispersed particles was about 300 nm (peak particle diameter). The dispersed particles were gelled particles which were insoluble in acetone and ethyl acetate.

Preparation Example 9 (Comparative Example)

| | |
|---|---|
| 50% Macromonomer B solution | 50 parts |
| Heptane | 150 parts |
| Xylene | 25 parts | were charged in a flask and the temperature was elevated to a reflux temperature. To this was added dropwise a mixture of the following monomers and polymerization initiator in 5 hours at a uniform rate, followed by aging for 4 hours to obtain a polymer fine particle dispersion (VI).

| | | |
|---|---|---|
| 50% Macromonomer B solution | 50 | parts |
| Methyl methacrylate | 96 | parts |
| Glycidyl methacrylate | 2 | parts |
| Methacrylate acid | 2 | parts |
| 2,2'-Azobisisobutyronitrile | 1.5 | part |
| Dimethylaminoethanol | 0.1 | part |

The dispersion (VI) thus obtained was a white dispersion which had a solid content 40%. The particle diameter of the dispersed particles was about 250 nm (peak particle diameter). The dispersed particles were insoluble in acetone and ethyl acetate.

PREPARATION OF BASE ACRYLIC RESIN SOLUTION

Preparation Example 10

| In a flask were charged | |
|---|---|
| Xylene | 75 parts |
| Butyl acetate | 25 parts | and the mixture was heated to 110° C. To this was added dropwise a mixture of the following monomers and polymerization initiator at a uniform rate in 4 hours, and the resulting mixture was aged for 1 hour to obtain a transparent acrylic resin solution A having a solid content of 50%.

| | |
|---|---|
| Styrene | 10 parts |
| n-Butyl methacrylate | 20 parts |
| n-Butyl acrylate | 18 parts |
| 2-Ethylhexyl methacrylate | 30 parts |
| 2-Hydroxypropyl acrylate | 20 parts |
| Acrylic acid | 2 parts |
| t-Butyl peroctoate | 4.5 parts |

The resulting acrylic resin had a number average molecular weight of about 4,200, a hydroxyl group value of 86 mgKOH/g resin and an SP value of 8.73. The resin was not compatible with macromonomers A-1 and A-2 but compatible with macromonomer B.

Preparation Example 11 (for Comparative Example)

Preparation Example 10 was repeated except that the following mixture was used instead of that used in Preparation Example 10, and a transparent acrylic resin solution (B) having a solid content of 50% was obtained.

| Styrene | 20 parts |
| Methyl methacrylate | 58 parts |
| 2-Hydroxyethyl methacrylate | 20 parts |
| Acrylic acid | 2 parts |
| t-Butyl peroctoate | 4.5 parts |

The acrylic resin obtained had a number average molecular weight of about 8,000, a hydroxyl group value of 86 mgKOH/g resin and an SP value of 9.6. The resin was compatible with none of macromonomers A-1, A-2 and B.

EXAMPLES 1 TO 4 AND COMPARATIVE EXAMPLES 1 TO 4

The polymer fine particle dispersions, the acrylic resin solutions and additives were blended in various proportions shown in Table 1 below and mixed with stirring. The resulting mixtures were adjusted with an aromatic hydrocarbon solvent PEGASOL 150 (produced by Mobile Petroleum Co.) to have a viscosity of 30 seconds/Ford cup #4, 20° C. to obtain clear paints.

were coated on the film of the base coat to a dry thickness of 40 μm, and set for about 9 minutes at room temperature, followed by heat setting at 140° C. for 30 minutes in an electric oven with internal air circulation. The coating of the clear paints was performed both on horizontal and vertical planes. The coated steel plates were heat set while they are being held horizontally or vertically in the same state as they were coated.

The thus-coated steel plates were examined for their vertical plate luster, horizontal plane luster, and horizontal plane finish appearance. Evaluation of the horizontal plane finish appearance was made according to the following criteria.

X: Poor in gloss and smoothness by visual observation;
O: Fair in gloss and smoothness by visual observation;

The vertical plane sag level was evaluated as follows. That is, the clear paints were coated on the steel plates longitudinally from the left ends to the right ends thereof using a spray gun so that the thickness of the coatings varied continuously from 20 to 60 μm (based on set film thickness), and the thus-coated films were heat set with holding the coated plates vertically during the setting with other conditions being the same as described above. The steel plates were examined from the largest thickness (base on set film thicknesses) of the respective clear paints at which no sagging did occur were determined. Evaluation was made based on the following criteria.

X: The largest thickness of the clear paint is smaller than 35 μm;
Δ: The largest thickness of the clear paint is from 35 to 45 μm;
O: The largest thickness of the clear paint is larger than 45 μm;

TABLE 1

| Composition | Example | | | | Comparative Example | | | |
| --- | --- | --- | --- | --- | --- | --- | --- | --- |
|  | 1 | 2 | 3 | 4 | 1 | 2 | 3 | 4 |
| Dispersion (I) of 40 wt. % fine particles of polymer | 25 | — | — | — | — | — | 25 | — |
| Dispersion (II) of 40 wt. % fine particles of polymer | — | 25 | — | — | — | — | — | 25 |
| Dispersion (III) of 40 wt. % fine particles of polymer | — | — | 25 | — | — | — | — | — |
| Dispersion (IV) of 40 wt. % fine particles of polymer | — | — | — | 25 | — | — | — | — |
| Dispersion (V) of 40 wt. % fine particles of polymer | — | — | — | — | 25 | — | — | — |
| Dispersion (VI) of 40 wt. % fine particles of polymer | — | — | — | — | — | 25 | — | — |
| 50% Acrylic Resin Solution A | 120 | 120 | 120 | 120 | 120 | 120 | — | — |
| 50% Acrylic Resin Solution B | — | — | — | — | — | — | 120 | 120 |
| 70% U-van 20HS*1 | 42.9 | 42.9 | 42.9 | 42.9 | 42.9 | 42.9 | 42.9 | 42.9 |
| Raibo No. 3*2 | 0.1 | 0.1 | 0.1 | 0.1 | 0.1 | 0.1 | 0.1 | 0.1 |
| Sag Level on Vertical Plane | O | O | O | O | O | X | O | O |
| Luster on Vertical Plane (20° Gloss) | 92 | 91 | 91 | 90 | 79 | 81 | 70 | 71 |
| Luster on Horizontal Plane (20° Gloss) | 93 | 92 | 93 | 92 | 82 | 93 | 72 | 72 |
| Finish Appearance | O | O | O | O | X | O | X | X |

Notes
*1: Melamine resin produced by Mitsui Toatsu Chemical Co., Ltd.
*2: Silicone additive for paints containing 1% of the effective ingredient, a product of Raibo Chemical Co., Ltd.
All parts are by weight.

Test Method

On steel plates having a cation electroplated coating and an intercoating was coated twice a metallic base coat, MAGICRON BASE (silver metallic color), produced by Kansai Paint Co., Ltd. to a dry thickness of 18 μm by air spray coating. After setting for 4 minutes at room temperature, the above-described clear paints The invention has been described in detail with respect to embodiments, and it will now be apparent from the foregoing to those skilled in the art that changes and modifications may be made without departing from the invention in its broader aspects, and it is the invention, therefore, in the appended claims to cover all such changes and modifications as fall within the true spirit of the invention.

What we claim is:

1. A dispersion of fine particles of a gelled polymer obtained by copolymerizing and crosslinking a vinyl monomer mixture containing at least 0.5% by weight each of at least two vinyl monomers in the presence of a macromonomer A, which has a molecular chain of poly(12-hydroxystearic acid) and has at least about one polymerizable unsaturated double bond per molecule in average, and a macromonomer B, which is a copolymer of an ethylenic unsaturated monomer and has a solubility parameter value of from 7.5 to 9.2 and about 1.0 to about 1.5 in average of polymerizable unsaturated double bonds, in an organic solvent which is capable of dissolving said macromonomers A and B but is substantially incapable of dissolving a polymer formed from said vinyl monomer mixture.

2. A dispersion as claimed in claim 1, wherein said macromonomer A is a macromonomer having about one in average of polymerizable unsaturated double bond per molecule and obtained by reacting a monoepoxy group-containing polymerizable unsaturated compound with a terminal carboxyl group of poly(12-hydroxystearic acid) by addition reaction, or by reacting a monoisocyanate group-containing polymerizable unsaturated compound with a terminal carboxyl group or secondary hydroxyl group of poly(12-hydroxystearic acid).

3. A dispersion as claimed in claim 2, wherein said monoepoxy group containing compound is selected from the group consisting of glycidyl acrylate, glycidyl methacrylate, allyl glycidyl ether, (3,4-epoxycyclohexyl)methyl methacrylate and (3,4-epoxycyclchexyl)-methyl acrylate.

4. A dispersion as claimed in claim 2, wherein said monoisocyanate group-containing compound is selected from isocyanatoethyl acrylate, isocyanatoethyl methacrylate, m-isopropenyl-alpha,alpha-dimethylbenzyl isocyanate, and equimolar adducts between a diisocyanate compound and an hydroxyalkyl acrylate or methacrylate.

5. A dispersion as claimed in claim 1, wherein said macromonomer A is a macromonomer having in average about 1 to about 10 polymerizable double bonds per molecule obtainable by providing a reaction product having in average about one polymerizable double bond per molecule obtained by adding an epoxy group-containing polymerizable unsaturated compound to a terminal carboxyl group of a poly(12-hydroxystearic acid) or by reacting an isocyanate group-containing polymerizable unsaturated compound with a terminal carboxyl group or secondary hydroxyl group of said poly(12-hydroxystearic acid), further reacting said reaction product with a polymerizable unsaturated monomer mixture containing a polymerizable unsaturated monomer having an epoxy group by graft copolymerization or block copolymerization to form a grafted epoxy group-containing copolymer, and reacting a polymerizable unsaturated carboxylic acid with said grafted epoxy group-containing copolymer.

6. A dispersion as claimed in claim 5, wherein macromonomer A is a macromonomer having in average from 4 to 7 polymerizable double bonds per molecule obtainable by providing a polymerizable unsaturated group-containing reaction product having in average about one polymerizable double bond per molecule obtained as by adding glycidyl methacrylate to a terminal carboxyl group of a poly(12-hydroxystearic acid), further reacting said reaction product with a polymerizable unsaturated monomer mixture mainly composed of methyl methacrylate and containing glycidyl methacrylate by graft copolymerization or block copolymerization to form a grafted epoxy group-containing copolymer, and reacting acrylic acid or methacrylic acid with said grafted epoxy group-containing copolymer.

7. A dispersion as claimed in claim 1, wherein said macromonomer B has from 1.0 to 1.5 in average of polymerizable double bonds per molecule.

8. A dispersion as claimed in claim 1, wherein said macromonomer B has a number average molecular weight of from 3,000 to 20,000 and a hydroxyl value of from 45 to 150 mgKOH/g.

9. A dispersion as claimed in claim 1, wherein said macromonomer B is a polymer having a polymerizable double bond obtainable by reacting glycidyl acrylate or glycidyl methacrylate with a carboxyl group in a copolymer derived from a vinyl monomer having no reactive group mainly composed of a long chain alkyl ester of acrylic acid or methacrylic acid, a carboxyl group-containing vinyl monomer and optionally a hydroxyl group-containing vinyl monomer.

10. A dispersion as claimed in claim 1, wherein combination of said complementary groups is selected from the group consisting of an epoxy group/a carboxyl group, a hydroxyl group/an isocyanate group, an epoxy group/an amino group, an isocyanate group/an amino group, an alkoxysilyl group/a hydroxyl group, and an epoxy group/a phosphoric acid group.

11. A dispersion as claimed in claim 10, wherein combination of said complementary groups is selected from the group consisting of an epoxy group/a carboxyl group, a hydroxyl group/anisocyanate group, alkoxysilyl group/a hydroxyl group, and an epoxy group/a phosphoric acid group.

12. A dispersion as claimed in claim 1, wherein said vinyl monomer mixture contains from 0.5 to 20% by weight each of at least two vinyl monomers each having a complementary functional group.

13. A dispersion as claimed in claim 1, wherein said vinyl monomer mixture further contains less than 5% by weight of a polyvinyl monomer.

14. A dispersion as claimed in claim 1, wherein said vinyl monomer mixture contains no less than 50% by weight of at least one copolymerizable other vinyl monomer.

15. A dispersion as claimed in clam 14, wherein said other vinyl monomer is an ester of acrylic acid or methacrylic acid.

16. A dispersion as claimed in claim 14, wherein said macromonomer A and said macromonomer B are contained in a blend ratio A/B with a range of from 70/30 to 20/80 as weight ratio of solid content.

17. A dispersion as claimed in claim 1, wherein proportion of said dispersion stabilizer as sum of said macromonomer A and said macromonomer B to said vinyl monomer mixture is within a range of from 10/90 to 60/40 as weight ratio of dispersion stabilizer/vinyl monomer mixture.

* * * * *